(12) United States Patent
Erike

(10) Patent No.: US 6,173,495 B1
(45) Date of Patent: Jan. 16, 2001

(54) HIGH STRENGTH LOW CARBON AIR BAG QUALITY SEAMLESS TUBING

(75) Inventor: Eric C. Erike, Mesa, AZ (US)

(73) Assignee: TRW Inc., Lyndhurst, OH (US)

( * ) Notice: Under 35 U.S.C. 154(b), the term of this patent shall be extended for 0 days.

(21) Appl. No.: 09/310,807

(22) Filed: May 12, 1999

(51) Int. Cl.$^7$ ....................................................... B23P 15/00
(52) U.S. Cl. ............................................. 29/890.14; 29/428
(58) Field of Search ............................... 29/890.14, 428;
280/728.1, 777, 729, 740, 743.1; 72/283,
275, 325, 364

(56) References Cited

U.S. PATENT DOCUMENTS

| | | |
|---|---|---|
| 3,645,725 | 2/1972 | Denhard, Jr. et al. . |
| 4,706,383 | * 11/1987 | Saffari . |
| 4,765,953 | 8/1988 | Hagenfeldt et al. . |
| 4,790,471 | * 12/1988 | Turner . |
| 4,892,704 | 1/1990 | Sawaragi . |
| 5,348,344 | 9/1994 | Blumenthal et al. . |
| 5,620,204 | * 4/1997 | Frey . |
| 5,671,946 | * 9/1997 | Whalen et al. . |
| 5,821,446 | * 10/1998 | Chatley, Jr. . |
| 5,879,025 | * 3/1999 | Blumenthal . |
| 5,897,137 | * 4/1999 | Al-Amin et al. . |

FOREIGN PATENT DOCUMENTS

07331381A * 6/1994 (JP) .

* cited by examiner

Primary Examiner—I Cuda
(74) Attorney, Agent, or Firm—Tarolli, Sundheim, Covell, Tummino & Szabo L.L.P.

(57) ABSTRACT

A process for manufacturing a low-carbon steel pressure vessel, which may be used as an inflator housing (18), comprises providing a cylindrical billet of low-carbon steel which comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron. A tube is formed with a cylindrical wall by axially piercing the cylindrical billet, while the cylindrical billet is heated is at a temperature of about 1000° C. to about 1300° C. The thickness of the cylindrical wall is then reduced to a first thickness by a first cold drawing of the tube. The tube is annealed after the first cold drawing. The thickness of the cylindrical wall is further reduced to a second thickness by a second cold drawing. The cylindrical wall is reduced in thickness less than about 26% during the second cold drawing step.

9 Claims, 1 Drawing Sheet

HIGH STRENGTH LOW CARBON AIR BAG QUALITY SEAMLESS TUBING

FILED OF THE INVENTION

The present invention relates to a process for manufacturing a steel housing, and particularly relates to a process for manufacturing a steel housing of an inflator for inflating an inflatable vehicle occupant protection device.

BACKGROUND OF THE INVENTION

A known inflator for inflating a vehicle occupant protection device includes a quantity of gas, including a combustible gas, stored in an inflator housing. An igniter is actuatable to ignite the combustible gas. As the combustible gas burns, the combustion products heat the gas. The heated gas and the combustion products form an inflation fluid for inflating the vehicle occupant protection device.

SUMMARY OF THE INVENTION

In accordance with the present invention, a process for manufacturing a low-carbon steel pressure vessel, which may be used as an inflator housing, comprises providing a cylindrical billet of low-carbon steel which comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron. A tube with a cylindrical wall is formed by axially piercing the cylindrical billet, while the cylindrical billet is at a temperature of about 1000° C. to about 1300° C. The thickness of the cylindrical wall is then reduced to a first thickness by a first cold drawing of the tube. The tube is annealed after the first cold drawing. The thickness of the cylindrical wall is further reduced to a second thickness by a second cold drawing. The cylindrical wall is reduced in thickness less than about 26% during the second cold drawing step.

Preferably, the tube is laser welded to an endcap of low-carbon steel and an endwall of low-carbon steel. The low-carbon steel employed in the endcap and the endwall comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron.

BRIEF DESCRIPTION OF THE DRAWINGS

The foregoing and other features of the invention will become more apparent to one skilled in the art upon consideration of the following description of the invention and the accompanying drawings in which.

DESCRIPTION OF PREFERRED EMBODIMENT

Figure 1:
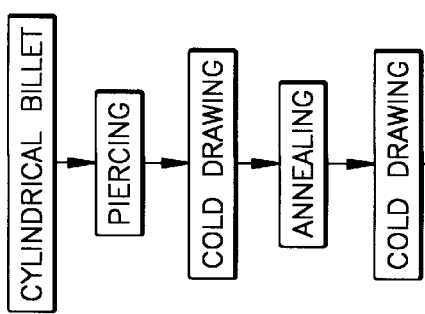
FIG. 1 is a schematic view of a vehicle occupant protection apparatus embodying the present invention.

Referring to FIG. 1, a vehicle occupant protection apparatus 10 includes an inflatable vehicle occupant protection device 12. In the preferred embodiment of the present invention, the inflatable vehicle occupant protection device 12 is an air bag. The inflatable vehicle occupant protection device 12 could be for example an inflatable seat belt, an inflatable knee bolster, an inflatable head liner or side curtain, or a knee bolster operated by an air bag.

An inflator 14 is associated with the vehicle occupant protection device 12. The inflator 14 is actuatable to direct inflation fluid to the inflatable vehicle occupant protection device 12 to inflate the inflatable vehicle occupant protection device 12.

The system also includes a crash sensor 16. The crash sensor 16 is a known device that senses a vehicle condition, such as vehicle deceleration, indicative of a collision. The crash sensor 16 measures the magnitude and the duration of the deceleration. If the magnitude and duration of the deceleration meet predetermined threshold levels, the crash sensor either transmits a signal or causes a signal to be transmitted to actuate the inflator 14. The inflatable vehicle occupant protection device 12 is then inflated and extends into the occupant compartment of the vehicle to help protect a vehicle occupant from a forceful impact with parts of the vehicle.

While the inflator 14 could be a pyrotechnic inflator (not shown), in the preferred embodiment of the invention, the inflator 14 is a heated gas inflator as disclosed in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc.

Figure 2:
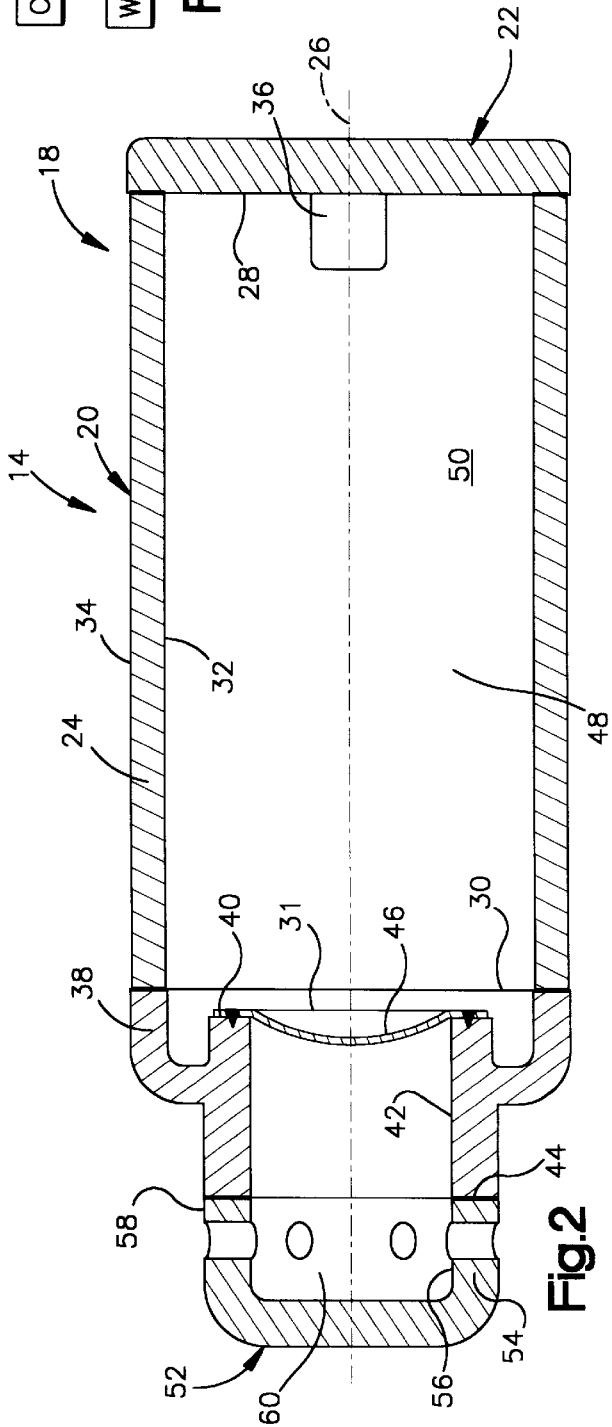
FIG. 2 is a sectional view of part of the apparatus of FIG. 1.

As shown in FIG. 2, the inflator 14 includes a housing 18. The housing 18 includes a container 20. The container 20 includes a generally cylindrical tubular side wall 24 extending along a central axis 26 between a first open end 28 of the tubular side wall 24 and a second open end 30 of tubular side wall 24. The tubular side wall 24 includes a cylindrical inner surface 32 and a cylindrical outer surface 34.

The housing 18 further includes an end cap 22 secured to the first open end 28 of the tubular side wall 24 by a weld. The end cap 22 supports an actuatable pyrotechnic igniter 36. The igniter 36 includes suitable ignitable material (not shown).

The housing 18 also includes an end wall 38 secured to the second open end 30 of the tubular side wall 24 by any suitable means such as a weld. The end wall 38 includes a radially extending first surface 40 and an axially extending cylindrical surface 42. The surfaces 40 and 42 are centered on the axis 26. The cylindrical surface 42 of the end wall 38 has a diameter smaller than the diameter of the inner surface 32 of the tubular side wall 24 and extends axially between and connects the first surface 40 of the end wall 38 and a radially extending second surface 44 of the end wall 38. The cylindrical surface 42 defines a passage 31 through the end wall 38.

A burst disk 46 is secured to the first surface 40 of the end wall 38 by any suitable means such as a weld. The burst disk 46 closes the passage 31. Together the burst disk 46 and the end wall 38 close the second open end 30 of the tubular side wall 24 to define a closed chamber 48 in the container 20. The chamber 48 is defined by the end wall 38, the burst disk 46, the cylindrical tubular side wall 24, and the end cap 22.

A supply of gas 50 for inflating the inflatable vehicle occupant protection device 12 is stored in the chamber 48. The supply of gas 50 comprises at least one inert gas. The preferred inert gas is nitrogen, argon, or a mixture of nitrogen and argon.

The supply of gas 50 may also include an oxidizer gas and a combustible fuel gas. A preferred oxidizer gas 50 is oxygen. Preferred fuel gases include hydrogen, nitrous oxide, and/or methane. The stored gas 50 may comprise a mixture of air and hydrogen.

Preferably, the stored gas 50 includes at least a small amount of a tracer gas, such as helium, for helping to detect gas leaks, as is known.

The stored gas 50 within the container 48 is under pressure. The pressure depends upon such factors as the volume of the inflatable vehicle occupant protection device 12 to be inflated, the time available for inflation, the inflation pressure desired, and the volume of the chamber 48 storing the gas. The stored gas 50 in the chamber 48 is typically at a pressure of about 2,000 to about 8,000 pounds per square inch (psi). Preferably, the stored gas 50 in the chamber 48 is at a pressure of about 3,500 psi to about 6,500 psi.

A diffuser 52 is connected to the second surface 44 of the end wall 38 by any suitable means such as a weld. The diffuser 52 includes a cylindrical side wall 54 coaxial with the tubular side wall 24 of the container 20 and centered on the axis 26. The side wall 54 includes a cylindrical inner surface 56 and cylindrical outer surface 58. The diffuser 52 has a central chamber 60. The chamber 60 is in fluid communication with the passage 31 in the end wall 38.

Figure 3:
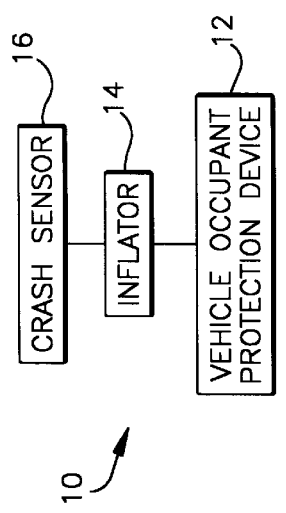
FIG. 3 is a schematic block diagram illustrating a preferred embodiment of the present invention.

In accordance with the preferred embodiment of the present invention, as schematically shown in FIG. 3, the tubular side wall 24 is manufactured from a cylindrical billet of low-carbon steel with a uniform diameter along the entire axis of the billet.

The low-carbon steel employed in the present invention has by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron. By residual elements it is meant additional elements including titanium, lead, niobium, cobalt, aluminum, calcium, and/or tin.

The mechanical properties for the low-carbon steel employed in the present invention include a tensile strength of about 130,000 psi to about 150,000 psi, a yield strength of at least about 104,000 psi, and an elongation at break of at least about 14%.

The cylindrical billet of steel is formed into a seamless tube with a cylindrical wall by passing the cylindrical billet through a known piercing mill.

In the present invention the cylindrical billet is heated to a temperature of about 1000° C. to about 1300° C. and, while at a temperature of about 1000° C. to about 1300° C., is passed through the piercing mill. Preferably, the cylindrical tube is heated to a temperature of about 1200° C. and, while at about 1200°C., is passed through the piercing mill.

The seamless tube so formed has a cylindrical wall with a thickness uniform along the axis of the tube and circumferentially around the tube. The outer diameter of the cylindrical wall is substantially less than the diameter of the cylindrical billet. The length of the seamless tube is substantially longer than the length of the cylindrical billet.

The seamless tube is cooled to room temperature, i.e. about 22° C. Once the tube is at room temperature, the tube may be pickled in an acid solution to remove any scale or oxides formed on the inner or outer surface of the cylindrical wall during piercing. Suitable pickling solutions may include sulfuric acid, phosphoric acid, nitric acid, hydrochloric acid, and combinations thereof.

The cylindrical wall of the tube is then reduced in thickness to a first thickness by a first cold drawing of the tube. Cold drawing involves pulling a tube at room temperature through a die, the hole of which is smaller than the outside diameter of the tube being drawn. At the same time, the inside surface of the tube is supported by a mandrel anchored on the end of a rod so that the tube remains in the plane of the die during the drawing operation.

The tube in the present invention may be lubricated with an oil based or water based emulsion prior to the first cold drawing in order to reduce the heat generated by friction as the tube passes through the die.

The first thickness of the cylindrical wall is uniform along the axis of the tube and circumferentially around the tube. The first thickness of the cylindrical wall is substantially less than the thickness of the cylindrical wall prior to the first cold drawing.

The tube is then annealed. Preferably, the tube is annealed at a temperature of about 500° C. to about 550° C. for at least about forty-five minutes in an air atmosphere.

The tube is cooled to room temperature and the cylindrical wall of the tube is further reduced in thickness to a second thickness by a second cold drawing of the tube. The second thickness of the cylindrical wall is uniform along the axis of the tube and circumferentially around the tube.

It is critical that the cylindrical wall be reduced in thickness less than about 26% during the second cold drawing of the tube.

The tube with the cylindrical wall of second thickness is cut to a desired length by any suitable means. The tube cut to length is welded to an endcap, such as 22, of low-carbon steel and an endwall, such as 38, of low-carbon steel. The endwall is also welded to a diffuser, such as 52, of low-carbon steel. The low-carbon steel employed in the endcap, the endwall, and diffuser comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron.

The tube cut to length, endcap, endwall, and diffuser are welded together by any suitable means such as autogenous gas tungsten arc welding, electron beam welding, or laser welding. Preferably, the tube, endcap, endwall, and diffuser are welded together by laser welding.

The parts so formed exhibit outstanding mechanical properties including no stress corrosion cracking in the welds or in the base material of the endcap, tube, endwall, and diffuser adjacent to the welds. Further, the parts showed no evidence of hydrogen embrittlement in the welded portions. Reductions in thickness in excess of about 26% in the second cold drawing step results in tubes which are susceptible to stress corrosion cracking and hydrogen embrittlement over the life of an inflator used in a vehicle occupant protection apparatus and incorporating such a tube.

EXAMPLE

An inflator housing, like housing 18, was prepared from a cylindrical billet of low-carbon steel. The cylindrical billet had a length of about 3 meters and a diameter of about 20.32 centimeters. The composition of the cylindrical billet of low-carbon steel was selectively controlled such that the low-carbon steel comprised by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron. The mechanical properties for the low-carbon steel included a tensile strength of about 130,000 psi to about 150,000 psi, a yield strength of at least about 104,000 psi, and elongation at break of at least about 14%.

The cylindrical billet was heated to a temperature of about 1200° C. and, while at 1200° C., passed through a piercing mill to form a seamless tube with a uniform wall thickness of about 6.35 cm along the entire axis of the tube and circumferentially entirely around the tube. The inner diameter of the cylindrical wall was about 7.62 cm and the outer diameter was about 13.97 cm.

After piercing, the tube was allowed to cool until it reached room temperature. Once at room temperature, the thickness of the cylindrical wall was reduced by a first cold drawing of the tube to a first thickness which was uniform along the entire axis of the tube and circumferentially entirely around the tube. The first thickness was about 4.26 mm. The inner and outer diameters of the cylindrical wall were also reduced respectively to about 71.3 mm and 75.5 mm.

The tube was annealed at a temperature of about 520° C. for about 45 minutes and then cooled to room temperature.

The thickness of the cylindrical wall was then reduced less than 26% by a second cold drawing to a second thickness which was uniform along the entire axis of the tube and circumferentially entirely around the tube. The second thickness was about 3.33 mm. The inner and outer diameters of the cylindrical wall were also reduced respectively to about 57 mm and 60.33 mm.

The tube was cut to the desired length to form a cylindrical wall, such as 24, and laser welded to an end cap, such as 22, of low-carbon steel and an endwall, such as 38, of low-carbon steel. The endwall was also welded to a diffuser, such as 52, of low-carbon steel. The composition of the low-carbon steel employed in the endcap, endwall, and diffuser was selectively controlled such that the low-carbon steel comprised by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron. The mechanical properties for the steel included a tensile strength of about 130,000 psi to about 150,000 psi, a yield strength of at least about 104,000 psi, and elongation at break of at least about 14%.

A c-ring type specimen was removed from the welded portion of the housing and placed in a 3% NaCl saturated air atmosphere. The c-ring type specimen was maintained at 25° C. and subjected to 1.5 V from a Ag/AgCl hydrogen cathode charging mechanism. Stress equivalent to 100% of the actual yield strength was applied to the c-ring sample for one month.

Analysis by thermal absorption spectrometry and scanning electron microscopy revealed no evidence of hydrogen embrittlement in the welded portion or base metal surrounding the welded portion of the c-ring type specimen after the one month period.

Additionally, a c-ring type specimen was removed from a welded portion of the housing and placed in a 3% NaCl saturated air atmosphere at 80° C. Stress equivalent to 100% of the actual yield strength was applied to the c-ring sample for one month.

Analysis by thermal absorption spectrometry and scanning electron microscopy revealed no evidence of stress corrosion cracking in the welded portion or base metal surrounding the welded portion of the c-ring type specimen after the one month period.

Advantages of the present invention should now be apparent. Primarily, the present invention takes advantage of the improved mechanical properties of a housing manufactured from low-carbon steel of which the composition has been selectively controlled and which has been mechanically treated by controlled piercing and cold drawing of the steel. The housing so formed has mechanical strength similar to stainless steel and exhibits no evidence of stress corrosion cracking along the welds between the housing components. Furthermore, there is no evidence of stress corrosion cracking of the portion of the housing components adjacent to the welds. Moreover, low-carbon steel with the composition of the present invention and mechanically treated by the method of the present invention exhibits no hydrogen embrittlement in the welds or portions of the housing components adjacent to the welds.

From the above description of the invention, those skilled in the art will perceive improvements, changes and modifications. Such improvements, changes and modifications within the skill of the art are intended to be covered by the appended claims.

Having described the invention, the following is claimed:

1. A process comprising the steps of:
   providing a cylindrical billet of low-carbon steel, wherein said steel comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron;
   forming a tube having a cylindrical wall by piercing said cylindrical billet, while said cylindrical billet is at a temperature from about 1000° C. to about 1300° C.;
   reducing the thickness of said cylindrical wall to a first thickness by a first cold drawing of said tube;
   annealing said tube after said first cold drawing; and
   reducing the thickness of said cylindrical wall to a second thickness by a second cold drawing of said annealed tube, said cylindrical wall being reduced in thickness less than about 26% during said second cold drawing step.

2. The process as defined in claim 1 further comprising cutting said tube to a desired length after said second deep drawing.

3. The process as defined in claim 2 further comprising welding said tube cut to said desired length to an endcap and an endwall each of which is made of low-carbon steel which comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron.

4. The process as defined in claim 1 wherein said cylindrical billet is pierced at a temperature of about 1200° C.

5. The process as defined in claim 1 wherein said tube is annealed at a temperature of about 500° C. to about 550° C. after said first cold drawing of said tube.

6. The process as defined in claim 1 further comprising pickling said tube in an acid solution after piercing said cylindrical billet.

7. A process comprising the steps of:
providing a cylindrical billet of low-carbon steel, wherein said steel comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron;
forming a tube having a cylindrical wall by piercing said cylindrical billet, while said cylindrical billet is at a temperature from about 1000° C. to about 1300° C.;
reducing the thickness of said cylindrical wall to a first thickness by a first cold drawing of said tube;
annealing said tube after said first cold drawing;
reducing the thickness of said cylindrical wall to a second thickness by a second cold drawing of said annealed tube, said cylindrical wall being reduced in thickness less than about 26% during said second cold drawing step;
cutting said tube to a desired length after said second drawing step; and
welding said tube cut to said desired length to an endcap and an endwall each of which is made of low-carbon steel which comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron.

8. A process as defined in claim 7 further comprising placing an air bag inflation gas in a chamber defined by said tube, endcap, and endwall.

9. A process as defined in claim 7 further comprising welding to said endwall a diffuser of low-carbon steel which comprises by weight about 0.07% to about 0.15% carbon, about 1% to about 2% manganese, less than about 0.02% phosphorous, less than about 0.015% sulfur, about 0.5% to about 2.10% chromium, about 0.2% to about 1.0% nickel, about 0.2% to about 0.7% molybdenum, less than about 0.65% copper, less than about 0.25% residual elements, and the balance of the composition iron.

* * * * *